Figure 1:
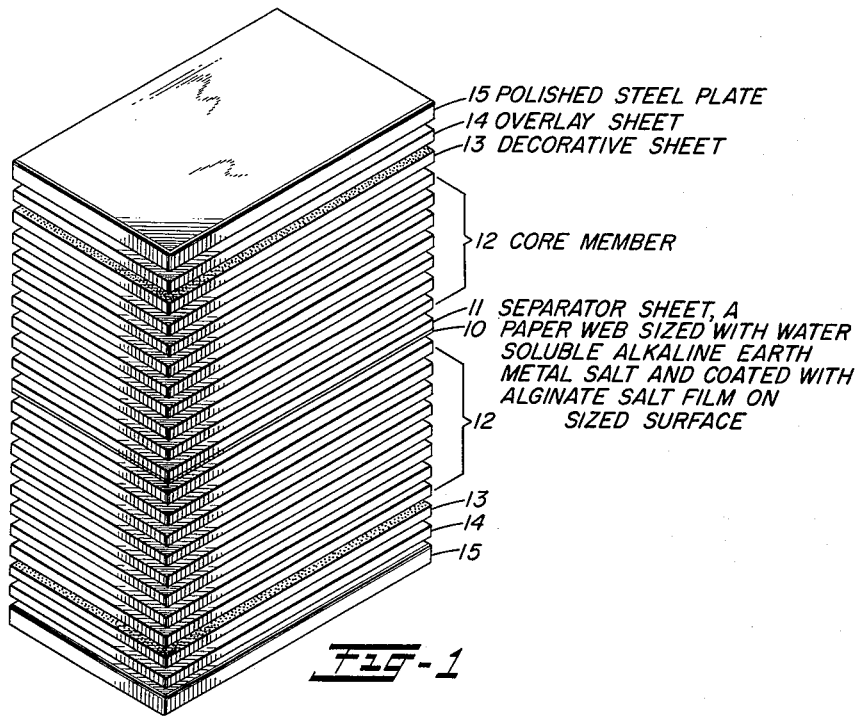

Nov. 2, 1965    J. F. HAGEN    3,215,579
PROCESS FOR RELEASING LAMINATES
Filed Jan. 23, 1963

INVENTOR.
JOHN F. HAGEN
BY James T. Dunn
ATTORNEY

United States Patent Office 3,215,579
Patented Nov. 2, 1965

3,215,579
PROCESS FOR RELEASING LAMINATES
John F. Hagen, Cincinnati, Ohio, assignor to Formica Corporation, Cincinnati, Ohio, a corporation of Delaware
Filed Jan. 23, 1963, Ser. No. 253,259
7 Claims. (Cl. 156—289)

This invention relates to a novel method of releasing laminates in a press pack from one another. This invention also relates to a novel method of releasing laminates in a press pack from one another when pressed back-to-back. More particularly, this invention relates to a novel method of releasing from one another in a press pack a plurality of heat- and pressure-consolidated resin-impregnated laminates, including those pressed back-to-back, e.g., decorative laminates, metal-clad laminates, and the like, which method comprises utilizing, as a separator sheet, a web of paper which has first been sized from aqueous solution with a water-soluble alkaline earth or earth metal salt, e.g., a calcium salt such as calcium chloride, and then coated on at least one side, i.e., a sized side, with a film of a salt of alginic acid, such as sodium alginate.

Laminates which can be separated by the method of the present invention generally comprise a plurality of resin-impregnated sheets or layers of fibrous material in matted or woven form which have been consolidated, under suitable conditions of heat and pressure, into a unitary structure. Such laminates are important articles of commerce, and have been produced for many years by a wide variety of methods.

When making such laminates it is conventional to utilize a plurality of resin-impregnated core sheets. The sheets employed for this purpose are usually prepared from cellulosic fibers, e.g., creped or uncreped kraft paper and the like, but can also be prepared from glass fibers, asbestos fibers and the like, or mixtures thereof with cellulosic fibers. In common practice, the fibrous core sheet material, in the form of a continuous sheet, is first impregnated with resin, usually a thermosetting synthetic resin and more particularly, in the case of cellulosic core sheets, a thermosetting phenolic resin such as a phenol-formaldehyde resin, a cresol-formaldehyde resin and the like, or, in the case of glass fiber containing core sheets, a thermosetting epoxy resinous material, e.g., a bisphenol A-epichlorohydrin resinous condensate. The resin-impregnated core sheet material is then dried to a desired volatile content and finally cut to the appropriate size.

Oftentimes laminates are prepared solely from a plurality of these resin-impregnated core sheets stacked in superimposed relationship, and the number of plies in the stack will depend on the use for which the laminate is intended. In most cases, however, one or more overlayments are placed on top or on both top and bottom of such a core assembly prior to lamination. Here too the number of plies of core sheet in the stack, as well as the numbers and kinds of additional laminae, will depend on the end use intended for the laminate.

Thus, for example, in preparing a conventional decorative laminating assembly a print sheet, which usually comprises a single, resin-impregnated sheet of pure grade absorbent α-cellulose or regenerated cellulose paper or similar fibrous material bearing an ornamental design or dyed or pigmented to impart a solid color thereto, is placed on top of the core member, which in this case generally contains from 6 to 8 plies. A protective overlay sheet, which is usually similar to the print sheet except for being undecorated, is then placed over the print sheet.

The resins used to impregnate the print and overlay sheets are generally thermosetting synthetic resins such as aminotriazine-aldehyde resins, e.g., melamine-formaldehyde and benzoguanamine-formaldehyde resins, or reactive, ethylenically unsaturated polyester resinous compositions, and the like, which do not develop any significant amount of undesirable discoloration when subjected to laminating temperatures.

Similarly, metal clad laminates are obtained from assemblies wherein a thin metal sheet or foil, e.g., a copper, silver or gold foil or a gold-plated silver foil, treated to remove dirt, oils, oxides and the like therefrom, is placed on top of the core member.

Laminating assemblies of this type may be individually laminated by application of heat and pressure thereto. However, for obvious economic reasons, it is common practice to consolidate a plurality of these individual laminating assemblies into one large assembly, or press pack, and then to laminate this pack in one operation.

Where individual laminating assemblies containing, besides the core member, overlayments such as those described above are concerned, and also where it is desired to obtain laminates having one major surface smooth and free of defects from a plurality of core sheets as the sole laminae, the press pack will be built from these individual laminating assemblies placed back-to-back.

In building such a pack, an individual laminating assembly is placed with its overlayment surface, or either surface in the case of an assembly consisting solely of core sheets, adjacent to a highly polished press plate of equal or slightly larger surface area. Metal press plates, and particularly those fabricated from highly polished stainless steel, are preferred, but plates made from other metals, such as aluminum, as well as from other materials having the desired characteristics, such as glass, may also be employed. The function of the press plate is twofold. First of all, since it presents a smooth, defect-free surface to one side of the laminating assembly, it tends to provide a laminate having a surface with the same qualities. It also serves to separate individual pairs of back-to-back laminating assemblies, thus permitting a plurality of these assemblies to be consolidated into laminates in one operation.

Next, another individual laminating assembly is positioned back-to-back with the first assembly, with a separator sheet being placed between the core members of the individual assemblies. Then, another highly polished press plate is placed on the second individual assembly adjacent to its overlayment surface. Thus, at this point the pair of laminating assemblies can be considered as being in mirror-image relationship between the press plates, separated only by the separator sheet.

In its simplest embodiment, a back-to-back press pack would consist of this arrangement of one pair of individual laminating assemblies with a separator sheet between their core members. In actual commercial practice, however, the entire procedure as outlined above for assembling this first pair of stacks is usually repeated many times, until a pack having the desired height has been built. The press pack is then subjected to heat and pressure, generally by inserting it into a laminating press, to consolidate the individual laminating assemblies into unitary structures. When the press pack is removed from the laminating press, the resulting pairs of laminates, pressed back-to-back, are removed from between the press plates and then separated from one another at the locus of the separator sheet.

As previously indicated, this multiple laminating method affords definite economic advantages. However, as practiced commercially at the present time, it also has certain inherent disadvantages. Foremost among these is the fact that in order to be truly effective, the required separator sheet must, in many cases, be prepared from relatively costly materials. A partial solution to this problem is described in U.S. Patent No. 3,050,434 to Emily et al., which discloses a separator sheet comprising a web of paper coated on one side only with a film of a salt of alginic acid. It has been found, however, that while such sheets made from paper from a particular source of supply will in all cases provide effective separation, many times sheets made from the same type and grade of paper obtained from different sources will not work as well, and in some cases will not work at all, even though they carry the same alginate salt coating.

I have now discovered that any cellulosic paper web can be inexpensively made into an effective separator sheet for releasing laminates in a press pack from one another by first sizing the web with an aqueous solution of a water-soluble alkaline earth or earth metal salt and then coating the sized web on at least one side, i.e., a sized side, with a film of a salt of alginic acid.

It is, therefore, an object of this invention to provide a novel method of releasing laminates in a press pack from one another.

It is also an object of this invention to produce laminates, and particularly those pressed back-to-back, by a mass production technique in which individual laminating assemblies are separated by a novel separator sheet comprising a web of paper sized from aqueous solution with a water-soluble alkaline earth or earth metal salt and then coated on at least one side with a film of a salt of alginic acid, and the resulting laminates are released from one another at the locus of the separator sheet.

A further object of this invention is to produce laminates by an improved method which results in savings in production costs as compared to conventional methods.

These and other objects of my invention will be discussed in greater detail hereinbelow.

Among the more common of the alkaline earth metals and earth metals from which the salts used in the practice of the present invention are derived are magnesium, calcium, strontium, barium and aluminum. A wide variety of salts of the alkaline earth and earth metals may be employed, in fact, any salt or mixture of salts can be used which is sufficiently soluble in water to provide a solution which in turn will be sufficiently concentrated to permit sizing of the paper web with the necessary amount of alkaline earth or earth metal salt. A partial listing of such salts, as exemplified by calcium salts, includes calcium chloride, calcium bromide, calcium iodide, calcium acetate, calcium bromate, calcium ferricyanide, calcium nitrate, calcium thiocyanate, and the like.

A preferred method of preparing a separator sheet according to the practice of the present invention involves first sizing a paper web with an aqueous solution of one of the aforementioned alkaline earth or earth metal salts, using such methods as dipping, roll coating, spraying and the like, in one or several passes, to give a solids content of the salt distributed throughout the sized surface of the paper ranging from about 0.001% to about 10% by weight, and preferably from about 0.01% to about 0.1% by weight, based on the dry weight of the sized paper. One or both sides of the paper can be sized by this method.

Following the sizing treatment, the paper web is preferably dried to a low moisture content, e.g., less than about 8% by weight, based on the dry weight of the paper and then coated, e.g., by dipping, spraying or, preferably, by reverse roll coating, on one or both sides, i.e., where one side has been sized, this side is coated, where both sides have been sized, both can be coated, with an alginate salt film. However, the wet, alkaline earth or earth metal salt-sized paper web generally need not be dried prior to being coated with the alginate salt film so long as it is not coated by dipping or passing it through a bath containing the alginate salt (passing a wet, sized paper web through an alginate salt bath will usually cause the alginate salt to coagulate). Where the sized web is not dried before being coated with the alginate salt, coating can be accomplished by such methods as spraying, knife coating and the like.

Whether the sized paper web is wet or dry, the wet alginate salt film applied thereto will generally be at least about 0.0005 inch in thickness, and preferably will be at least about 0.001 inch in thickness. No upper limit on the thickness of the wet alginate salt film need be observed, although for all practical purposes a wet film more than about 0.01 inch thick is generally unnecessary. Among the alginates which can be employed are lithium alginate, sodium alginate, potassium alginate, iron alginate, ammonium alginate, and the like, as well as mixtures thereof. These alginates are readily available commercially, and come in a plurality of forms, most aqueous solutions having viscosities which will vary significantly with the concentration of alginate solids therein. In practicing the present invention, about 1–2% aqueous alginate salt solutions having viscosities ranging from about 5 centipoises to about 1000 centipoises at 25° C. are especially suitable.

After being coated with the alginate salt film, the paper is dried, preferably at elevated temperatures using a forced hot air drying oven, infrared heating means, or the like, to a desired moisture content, e.g., a moisture content of less than about 8% by weight, based on the total weight of the dried paper. The paper is then ready for use as a separator sheet.

An alternative method of preparing a separator sheet according to the practice of the present invention involves a sequence of steps wherein the paper web is first sized with the alkaline earth metal or earth metal salt, then impregnated throughout with a thermosetting synthetic resin, e.g., the resin, such as a phenolic resin, used in the sheets which constitute the core members in the laminates being separated, and finally coated on one side only with the alginate salt film and dried to a low volatile content, e.g., a volatile content of less than about 8%.

Where the separator sheet, whether impregnated or unimpregnated with a thermosetting synthetic resin, is coated on one side only with the film of alginate salt, it will become an integral part of one of the laminates which it separates. On the other hand, where the separator sheet is coated on both sides with an alginate salt film, it can be removed from between the finished laminates.

If desired, a pair of sheets coated on one side only with the alginate salt film rather than a single sheet can be used in separating laminating assemblies and releasing the individual laminates. In using such a pair of sheets, their alginate-coated surfaces will be positioned face-to-face in direct contact with one another. Thus, upon separation of the pair of laminates, the respective separator sheets will remain an integral part of the laminates to which they adhere on their uncoated sides.

The backs of laminates separated by means of my novel process can be smoothed down, e.g., by sanding, particularly where the back of the laminate is coated with the alginate salt film.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

*Example I*

Separator sheet material sized and then coated according to the practice of the present invention was prepared in the following manner. A roll of standard saturating-type kraft paper (basis weight 100 lbs.; W. Va. Pulp & Paper Co.) was sized on one side from a bath containing a 10% aqueous calcium chloride solution by passing the paper, at a speed of 175 feet per minute, between the pickup roller and a nip roller in a single gravure printing unit. The wet, sized paper was dried in an infrared heating oven at a temperature of 115° C. to give a dry, sized paper having a moisture content of 6% and 0.75% of calcium chloride, based on the dry weight of the sized paper, distributed throughout the sized side.

The dry, sized paper was then impregnated throughout with a commercially available phenolformaldehyde resin solution to a 25% resin pickup, and dried to a flow of 6%. Next, the dry paper was coated on its sized side with a wet sodium alginate film approximately 0.001 inch in thickness from a bath containing a 1.65% aqueous sodium alginate solution by passing the paper, at a speed of 150 feet per minute, from a coating pickup roller through a drying oven maintained at 150° C. to a wind-up roll. Separator sheets were then cut from this roll as needed.

*Examples II–XII*

In each of these examples, separator sheet material was prepared by following the procedure of Example I in every detail except for the following. The separator sheet material made in Example II served as a control, and was prepared by omitting the calcium chloride sizing treatment and merely impregnating the kraft paper web with the phenolformaldehyde resin and then coating the impregnated web on one side with the alginate salt. In Examples III–VII, the amount of calcium chloride applied to the paper was varied to give sheets containing 0.001%, 0.01%, 0.1%, 1% and 10%, respectively, of calcium chloride, based on the dry weight of the sized paper, distributed throughout the sized side. Next, in Examples VIII–XI, the calcium chloride was replaced by calcium nitrate, calcium acetate, magnesium chloride and aluminum sulfate, respectively, giving separator sheets containing, in each case, 0.01% of the particular salt employed, again based on the dry weight of the sized paper, distributed throughout the sized side. Finally, in Example XII, the sodium alginate employed in Example I was replaced by potassium alginate.

*Example XIII*

A laminating assembly was prepared by stacking, in superimposed relationship, a commercially available melamine-formaldehyde resin-impregnated α-cellulose overlay sheet, a commercially available melamine-formaldehyde resin-impregnated cellulosic print sheet bearing a wood print design, and seven sheets of standard phenolic resin-impregnated core stock. Next, an identical assembly was prepared in the same manner. Then, a separator sheet prepared as described in Example I, with its alginate-coated side facing out, was positioned below the last core sheet in each of these laminating assemblies. The two assemblies were then placed together so that the alginate-coated sides of the respective separator sheets faced one another, polished press plates were placed next to the overlay sheet member of each laminate to sandwich the pair of back-to-back assemblies between the press plates, and the entire assembly was then inserted in a laminating press and consolidated at a temperature ranging from 135° C. to 142° C. under a pressure of 1400 lbs./in.² for 20 minutes. Following lamination, the back-to-back laminating assemblies were cooled to room temperature and removed from the press. It was found that the two laminates could be easily separated at the locus of the separator sheets.

*Examples XIV–XXIV*

The procedure employed in Example XIII was repeated in every detail except one. In each case, the separator sheets of Example I were replaced by the sheets of Examples II–III, respectively. Where the separator sheets of Examples III–XII were used, the resulting pairs of back-to-back laminates were easily separable. In contrast to this, the back-to-back laminating assembly prepared using the separator sheets of Example II, wherein the paper was not sized with an alkaline earth or earth metal salt before being coated with an alginate salt film, was separated only with extreme difficulty, and it was apparent that such separator sheets would not be commercially feasible.

As those skilled in the art can readily appreciate, the term sizing, as used hereinabove with respect to the application of an alkaline earth or earth metal salt from aqueous solution to one or both sides of the paper web, refers to what is essentially a surface treatment. Of course, varying amounts of the particular salt used may penetrate either the interstices of the web or individual fibers in the web, or may coat fibers other than those immediately at the surface of the web, depending on such factors as the particular web being coated, the salt used, and the like. Nevertheless, an effective amount of the sizing agent, i.e., an amount ranging from about 0.001% to about 10% by weight, based on the dry weight of the sized paper, will remain at essentially the sized surface of the web and be distributed throughout this surface when the sizing agent is applied in the manner described hereinabove or by any other method which is essentially a surface coating treatment.

It will also be obvious to those skilled in the art that other changes and variations may be made in carrying out the present invention without departing from the spirit and scope thereof as defined in the appended claims.

Figure 2:
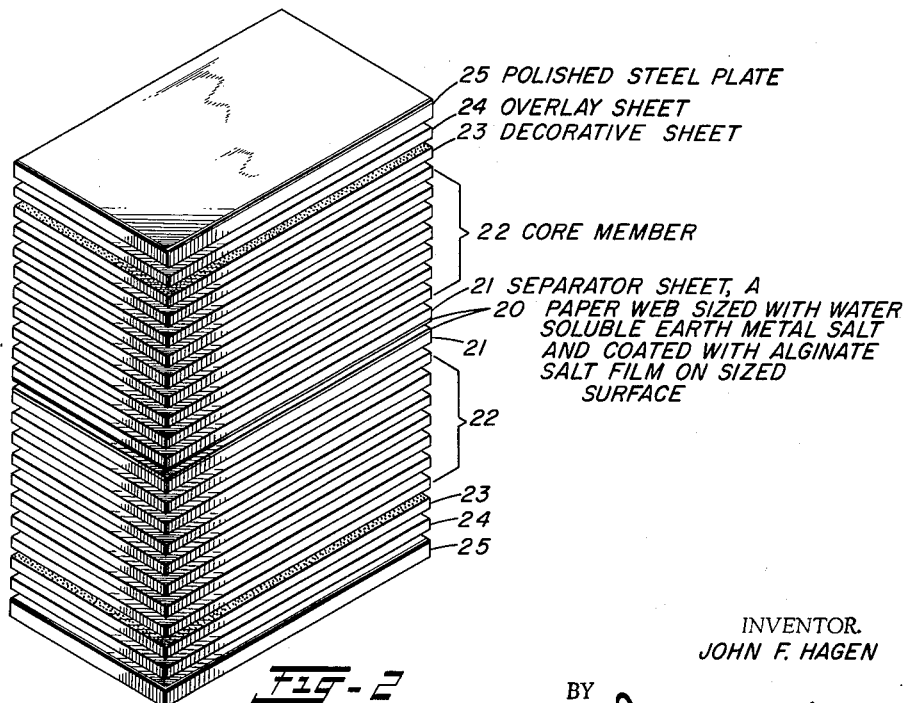

In the drawing:

FIGURES 1 and 2 are pictorial representations of multiple decorative laminating assemblies made up according to the practice of the present invention.

Referring now to the drawings, FIG. 1 shows a preferred embodiment of a multiple decorative laminating assembly in which an individual laminating assembly, or superimposed stack, of an overlay sheet 14, a decorative sheet 13, a core member 12 and a separator sheet comprising a paper web 11 sized on at least one side with a water-soluble salt of an alkaline earth metal onto which sized sheet there is applied a coating on one side only with an alginate salt film 10. The alginate salt film 10 must be applied to the same side of the separator sheet which is sized with the water-soluble alkaline earth metal salt when only one side of the separator sheet is sized with the water-soluble alkaline earth metal salt. The alginate salt film 10 is in superimposed mirror-image relationship to a similar superimposed stack of core members 12, a decorative sheet 13 and an overlay sheet 14, the whole of said multiple decorative laminating assembly being positioned between a pair of polished steel plates 15.

FIG. 2 shows an additional embodiment of a multiple decorative laminating assembly in which an individual laminating assembly, or superimposed stack, of an overlay sheet 24, a decorative sheet 23, a core member 22 and a separator sheet comprising a paper web 21 sized on at least one side with a water-soluble earth metal salt which sized sheet is in turn coated on one side only with an alginate salt film 20. The alginate salt film 20 must be coated on the same side of the separator sheet 21 which carries the sizing of the water-soluble earth metal salt when only one side of said separator sheet 21 carries said sizing of the water-soluble earth metal salt. The alginate salt film 20 is in superimposed mirror-image relationship to a similar superimposed stack of a separator sheet 21, coated on the side facing the alginate salt film of the corresponding separator sheet with an alginate salt film 20, a core member 22, a decorative sheet 23 and an overlay sheet 24, the whole of said multiple decorative laminating assembly being positioned between a pair of polished steel plates 25.

I claim:

1. A method of releasing laminates from one another in a heat- and pressure-consolidated press pack which comprises:

(1) arranging a plurality of thermosetting synthetic resin-impregnated fibrous core sheets in superimposed relationship in groups of at least two stacks,
(2) separating said stacks from one another with a separator sheet comprising a web of paper which has been sized on at least one side from aqueous solution with a water-soluble salt selected from the group consisting of alkaline earth metal salts and earth metal salts in an amount sufficient to provide a solids content of said salt distributed throughout the sized surface of said web ranging from about 0.001% to about 10% by weight, based on the dry weight of the sized web, and then coated on its sized side with a film of a salt of alginic acid,
(3) consolidating said stacks of core sheets by the application of heat and pressure thereto, and
(4) separating the resulting laminates from one another at the locus of said separator sheet.

2. A method of relasing laminates from one another in a heat- and pressure-consolidated press pack which comprises:
(1) arranging a plurality of thermosetting synthetic resin-impregnated fibrous core sheets in superimposed relationship in groups of at least two stacks,
(2) separating said stacks from one another with a separator sheet comprising a web of paper which has been sized on at least one side from aqueous solution with a water-soluble alkaline earth metal salt in an amount sufficient to provide a solids content of said salt distributed throughout the sized surface of said web ranging from about 0.001% to about 10% by weight, based on the dry weight of the sized web, and then coated on its sized side with a film of a salt of alginic acid,
(3) consolidating said stacks of core sheets by the application of heat and pressure thereto, and
(4) separating the resulting laminates from one another at the locus of said separator sheet.

3. A method of releasing laminates from one another in a heat- and pressure-consolidated press pack which comprises:
(1) arranging a plurality of thermosetting synthetic resin-impregnated fibrous core sheets in superimposed relationship in groups of at least two stacks,
(2) separating said stacks from one another with a separator sheet comprising a web of paper which has been sized on at least one side from aqueous solution with a water-soluble earth metal salt in an amount sufficient to provide a solids content of said salt distributed throughout the sized surface of said web ranging from about 0.001% to about 10% by weight, based on the dry weight of the sized web, and then coated on its sized side with a film of a salt of alginic acid,
(3) consolidating said stacks of core sheets by the application of heat and pressure thereto, and
(4) separating the resulting laminates from one another at the locus of said separator sheet.

4. A method of releasing laminates from one another in a heat- and pressure-consolidated press pack which comprises:
(1) arranging a plurality of thermosetting synthetic resin-impregnated fibrous core sheets in superimposed relationship in groups of at least two stacks,
(2) separating said stacks from one another with a separator sheet comprising a web of paper which has been sized on at least one side from aqueous solution with a water-soluble calcium salt in an amount sufficient to provide a solids content of said salts distributed throughout the sized surface of said web ranging from about 0.001% to about 10% by weight, based on the dry weight of the sized web, and then coated on its sized side with a film of a salt of alginic acid,
(3) consolidating said stacks of core sheets by the application of heat and pressure thereto, and
(4) separating the resulting laminates from one another at the locus of said separator sheet.

5. A method of releasing laminates from one another in a heat- and pressure-consolidated press pack which comprises:
(1) arranging a plurality of thermosetting synthetic resin-impregnated fibrous core sheets in superimposed relationship in groups of at least two stacks,
(2) separating said stacks from one another with a separator sheet comprising a web of paper which has been sized on at least one side from aqueous solution with a water-soluble aluminum salt in an amount sufficient to provide a solids content of said salt distributed throughout the sized surface of said web ranging from about 0.001% to about 10% by weight, based on the dry weight of the sized web, and then coated on its sized side with a film of a salt of alginic acid,
(3) consolidating said stacks of core sheets by the application of heat and pressure thereto, and
(4) separating the resulting laminates from one another at the locus of said separator sheet.

6. A method of releasing laminates from one another in a heat- and pressure-consolidated press pack which comprises:
(1) arranging a plurality of thermosetting phenolic resin-impregnated fibrous core sheets in superimposed relationship in groups of at least two stacks,
(2) separating said stacks from one another with a separator sheet comprising a web of paper which has been sized on at least one side from aqueous solution with calcium chloride in an amount sufficient to provide a solids content of calcium chloride distributed throughout the sized surface of said web ranging from about 0.01% to about 0.1% by weight, based on the dry weight of the sized web, and then coated on its sized side with a film of sodium alginate,
(3) consolidating said stacks of core sheets by the application of heat and pressure thereto, and
(4) separating the resulting laminates from one another at the locus of said separator sheet.

7. A method of releasing laminates from one another in a heat- and pressure-consolidated press pack which comprises:
(1) arranging a plurality of thermosetting phenolic resin-impregnated fibrous core sheets in superimposed relationship in groups of at least two stacks,
(2) separating said stacks from one another with a separator sheet comprising a web of paper which has been sized on at least one side from aqueous solution with calcium chloride in an amount sufficient to provide a solids content of calcium chloride distributed throughout the sized surface of said web ranging from about 0.01% to about 0.1% by weight, based on the dry weight of the sized web, and then coated on its sized side with a film of potassium alginate,
(3) consolidating said stacks of core sheets by the application of heat and pressure thereto, and
(4) separating the resulting laminates from one another at the locus of said separator sheet.

References Cited by the Examiner

UNITED STATES PATENTS

| | | | |
|---|---|---|---|
| 2,639,989 | 5/53 | Conover | 117—152 XR |
| 2,711,370 | 6/55 | Lurie | 117—152 XR |
| 2,729,579 | 1/56 | Rhone | 117—152 XR |
| 3,050,434 | 8/62 | Emily et al. | 156—289 |

EARL M. BERGERT, *Primary Examiner.*